United States Patent
Oversby et al.

(10) Patent No.: US 6,860,190 B2
(45) Date of Patent: Mar. 1, 2005

(54) PISTON FOR INTERNAL COMBUSTION ENGINE

(75) Inventors: Graham Oversby, Huddersfield (GB); Stuart Andrew Allan, Bingley (GB)

(73) Assignee: Federal-Mogul Bradford Limited, Manchester (GB)

( * ) Notice: Subject to any disclaimer, the term of this patent is extended or adjusted under 35 U.S.C. 154(b) by 33 days.

(21) Appl. No.: 10/399,027

(22) PCT Filed: Oct. 8, 2001

(86) PCT No.: PCT/GB01/04467

§ 371 (c)(1),
(2), (4) Date: Apr. 7, 2003

(87) PCT Pub. No.: WO02/31336

PCT Pub. Date: Apr. 18, 2002

(65) Prior Publication Data

US 2004/0094034 A1 May 20, 2004

(30) Foreign Application Priority Data

Oct. 7, 2000 (GB) .............................. 0024594

(51) Int. Cl.[7] .............................................. F02F 3/00
(52) U.S. Cl. .......................................... 92/208; 92/238
(58) Field of Search .......................... 92/208, 209, 238, 92/239

(56) References Cited

U.S. PATENT DOCUMENTS

| | | | | |
|---|---|---|---|---|
| 4,715,267 A | * | 12/1987 | Richmond | .................... 92/238 |
| 5,299,490 A | * | 4/1994 | Harrer et al. | .................. 92/208 |
| 6,073,602 A | * | 6/2000 | Muta | ........................ 123/193.6 |
| 6,152,016 A | * | 11/2000 | Bahr et al. | ...................... 92/208 |
| 6,357,341 B1 | * | 3/2002 | Watanabe et al. | ............. 92/238 |

FOREIGN PATENT DOCUMENTS

| | | | |
|---|---|---|---|
| DE | 199 18 328 A1 | 10/1999 | |
| GB | 2 347 194 A | 8/2000 | |
| GB | 2347194 A | * 8/2000 | ............. F02F/3/00 |
| JP | 2000-39066 | 2/2000 | |

* cited by examiner

*Primary Examiner*—Thomas E. Lazo
(74) *Attorney, Agent, or Firm*—Howard & Howard

(57) ABSTRACT

An engine piston has a crown portion generated about a longitudinal piston axis and, extending axially form the crown, a pair of gudgeon pin bosses defining a pin axis and spaced apart at opposite sides of an orthogonal thrust axis. A circumferentially discontinuous skirt defines lateral thrust and non-thrust bearing regions, respectively, centered on the thrust axis, each joined by convexly bowed reinforcement ribs to the bosses. The bearing region on the non-thrust side of the piston is circumferentially shorter than thrust region, reducing piston mass to one side of the piston, and the reinforcement ribs are offset in pin axis direction where they intersect the bosses. Mass reducing recesses are formed in the underside of the crown between the unskirted periphery reinforcement ribs and bosses, the offset ribs permitting the recesses to extend further and to permit greater reduction in mass. The asymmetry of mass reduction permits the bosses and pin axis to be offset toward the thrust region while having the center of mass of the piston acting through or near the pin axis.

11 Claims, 1 Drawing Sheet

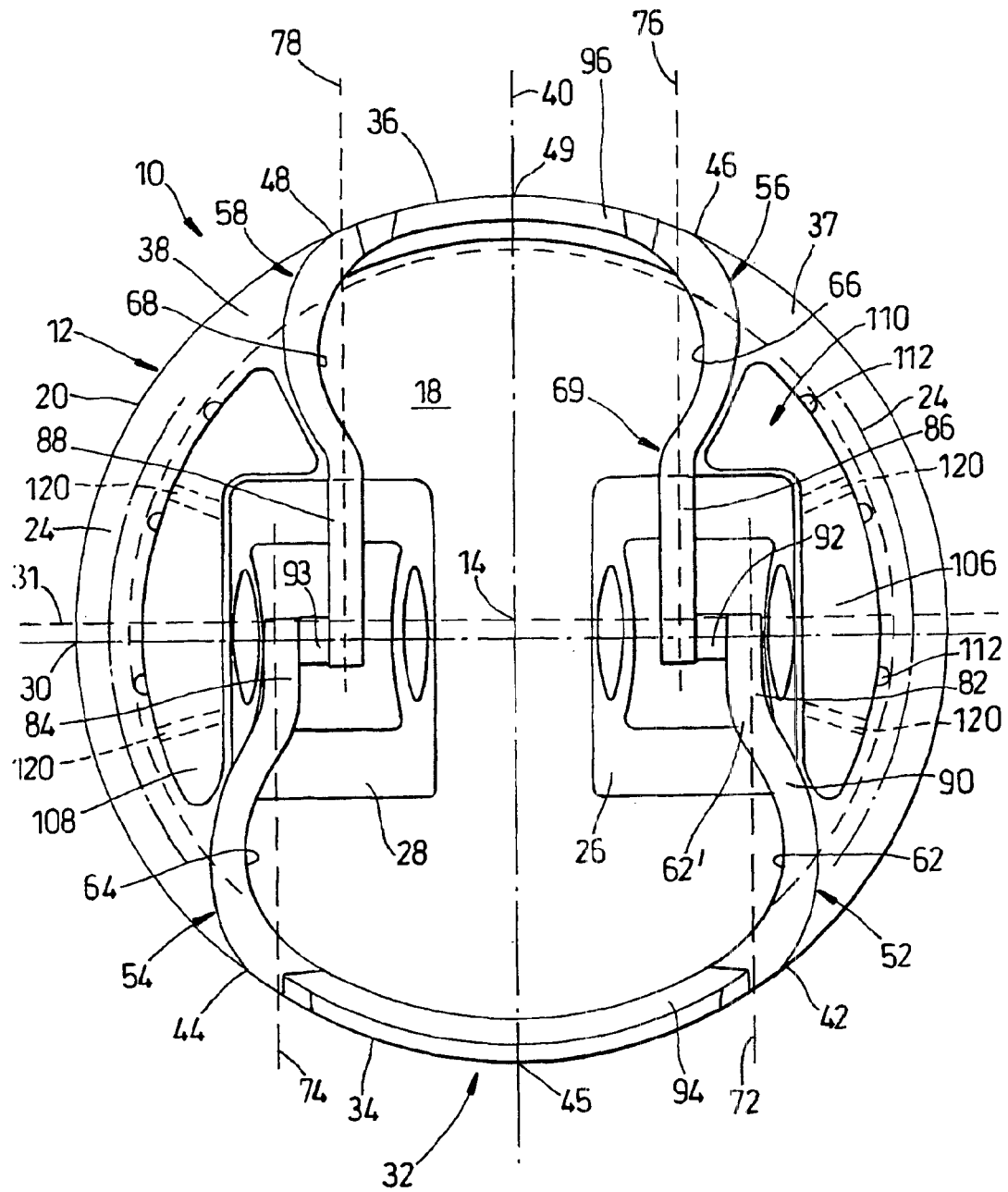

PISTON FOR INTERNAL COMBUSTION ENGINE

TECHNICAL FIELD

This invention relates to pistons for engines, and particularly to cast or forged one piece pistons for internal combustion engines.

RELATED ART

It is known to produce an engine piston cast from an aluminum alloy and configured to require minimal machining to result in a precision, relatively low cost component. It is also known that greater engine efficiency and/or performance can result from low friction between the piston and cylinder bore in which it reciprocates and from the use of a low mass piston, and to this end piston designs have been proposed that minimise the amount of metal used, particularly in friction creating regions.

It is known, for example, for a one piece piston to have a head, or crown, portion comprising an upper crown face, that in operation forms part of a combustion chamber, a lower crown face thereof comprising a support face, and extending between these faces, a perimeter wall defining a belt of ring grooves about an axis of revolution that is the longitudinal axis of the piston and along which it reciprocates. The crown is generally circular about the longitudinal axis and may be truly circular or depart therefrom in a minor way that is well known in the art as ovality. It is also known for such one piece piston to have a tubular skirt, generated about the longitudinal axis and extending axially from the head support face at the perimeter, to provide bearings for thrust forces between the reciprocating piston and cylinder bore acting laterally with respect to the longitudinal axis.

It is common practice to have the piston mounted on a connecting rod gudgeon pin for reciprocation along its longitudinal axis, by way of a pair of gudgeon pin bosses extending axially from the head support face and spaced from each other along a diametrical or near diametrical chord of the head defining a pin axis.

The lateral forces which act on a piston arise from the piston being forced into engagement with the cylinder wall by combustion pressures acting against the crown and the inclination of the connecting rod with respect to the longitudinal axis during reciprocation as well as thermal expansion of the piston within the cylinder.

Insofar as the lateral, friction causing, forces between piston and cylinder wall are from a combination of dynamic forces which vary during the engine cycle, from the combustion chamber and connecting rod, and relatively static forces thermal expansion of the piston and cylinder, it is known for the piston shape to depart from that of the cylinder such that contact between them is avoided except where necessary, Furthermore, as the dynamic lateral thrust forces act in a direction at right angles to the pin axis and are centred upon a diametrically extending thrust axis, it is known to confine the perimeter skirt to bearing-providing regions portions of the perimeter, and to provide strength and stiffness to the bearing regions by buttressing them against each other directly, by way of a circumferentially complete band, and/or by way of the pin bosses through reinforcement ribs extending axially from the head support face and connecting associated bearing regions to each other and the pin bosses.

The provision of such force-transmitting structures inboard of the head perimeter combines the reduction of frictional contact with the potential of greater stiffness than a perimeter-following tubular wall, but importantly also involves a reduction in the amount of metal employed.

As the lateral thrust forces acting on said opposite sides of the pin axis differ in relation to the forces on the piston that give rise to them, the bearing regions are also known as the thrust region and the non-thrust region.

An example of such a structure is shown in EP-A2-0902180, from which it is also known to create during manufacture (by casting) a weight reducing recess in the support face of the head in the region between each pin boss and the unskirted perimeter. Such recess is limited dimensionally with respect to proximity to the perimeter to be spaced therefrom by at least the radial depth of the ring grooves and by the positions of the reinforcement ribs.

In general, when pistons having incomplete skirts are viewed along the longitudinal axis, there is mirror image symmetry about the pin axis and about the thrust axis. It is, however, known to define the gudgeon pin axis displaced from a diameter of the piston that intersects the geometric longitudinal axis towards the thrust region so that it lies along a near-diametrical chord, the reason and effect being to displace the pin axis from the geometric axis, along which combustion pressure acts, and to create a turning movement that positions the piston within the cylinder to mitigate impact with the wall thereof before the piston has expanded at working temperature.

Such displacement of the pin axis with the pin bosses to the effect of offsetting the centre of mass also towards the thrust region, although by a lesser amount, but possibly enough to produce a separate turning movement about the pin axis that varies as a function of forces acting on the piston.

It is an object of the present invention to provide a one piece engine piston of improved low friction, low mass configuration.

SUMMARY OF THE INVENTION

According to the present invention an engine piston comprises a unitary metal body comprises
(i) a head of substantially circular cross-section centred on a longitudinal piston axis defined by an upper crown face, a lower support face and, extending between the faces, a perimeter wall of the head defining a belt of ring grooves,
(ii) a pair of gudgeon pin bosses, extending axially from the support face, spaced from the perimeter of the head and from each other along a diameter of the head defining a pin axis,
(ii) a circumferentially incomplete bearing skirt portion, extending axially, defining at the perimeter a thrust bearing region and a non-thrust bearing region spaced apart at opposite sides of the pin axis, each said bearing region extending circumferentially between region ends and being centred on a diameter of the head defining a thrust axis perpendicular to the pin axis, and
(iv) bearing skirt reinforcement ribs associated individually with said ends of the thrust and non-thrust bearing regions, each said reinforcement rib extending axially from the head and connecting its associated region end to a said gudgeon pin boss,
the piston being characterised by the thrust bearing region being of greater circumferential extent than the non-thrust bearing region and the reinforcement ribs associated with the ends of the thrust bearing region each having a curvilinear section comprising a substantially smooth transition from the end of the associated region into an outwardly convex section converging towards the associated gudgeon pin boss and merging therewith displaced in a direction along the pin axis towards the perimeter with respect to the reinforcement ribs extending from the ends of the non-thrust bearing region.

Preferably the support face has formed therein a pair of recesses associated one with each gudgeon pin boss, each said recess being disposed between the pin boss and the perimeter wall, and asymmetrical about the pin axis, the recess to one side of the axis being defined by the unskirted perimeter, the boss and the reinforcement rib connecting the thrust bearing region and the boss, and to the other side of the axis being defined by the unskirted perimeter, the boss and the reinforcement rib connecting the non-thrust region to the boss.

THE DRAWINGS

An embodiment of the invention will now be described by way of example with reference to the accompanying drawing which represents a view from below the piston along the longitudinal piston axis.

DETAILED DESCRIPTION

Referring to the FIGURE, engine piston 10 comprising a unitary metal body cast, or otherwise moulded of aluminum alloy or of steel, consisting of a head, or crown, 12 of substantially circular cross section centred on longitudinal axis 14. The head comprises an upper, substantially circular crown face (not shown), a lower support face 18 and extending between the circular faces a perimeter wall 20 defining a belt of axially spaced ring grooves 24. The cross section of the head may be circular or depart therefrom with a small degree of ovality common in the art, but notwithstanding such variations, it is convenient to consider the head as defined about such a single longitudinal axis 14 as the geometric centre of the crown.

A pair of gudgeon pin bosses 26, 28 extend axially from the support face, spaced from the perimeter of the head and from each other along a diametrical chord of the head support face that defines a pin axis 30, discussed further below, displaced by a small distance from diameter 31 that intersects the longitudinal axis 14.

A circumferentially incomplete bearing skirt portion, indicated generally at 32, also extends axially from the head support face, defining at the perimeter a thrust bearing region 34 and non-thrust bearing region 36 which are spaced apart at opposite sides of the pin axis and separated peripherally by unskirted portions 37, 38. Each said bearing region 34 and 36 is centred on a diameter of the head defining a thrust axis 40 perpendicular to the pin axis 30 and the diameter 31, intersecting the latter at the longitudinal axis 14. The thrust bearing region 34 extends circumferentially between region ends 42 and 44, being centred at 45 on the thrust axis, and the non-thrust bearing region 36 extends circumferentially between region ends 46 and 48, being centred at 49 on the thrust axis. The piston is symmetrical about the thrust axis.

Bearing skirt reinforcement ribs 52, 54, 56 and 58 are associated individually with the ends 42, 44, 46 and 48 of the thrust and non-thrust regions, each reinforcement rib extending from the head in the direction of the longitudinal axis and connecting its associated region end to a gudgeon pin boss. That is, the ribs 52 and 56 connect the region ends 42 and 46 respectively to the pin boss 26 and the ribs 54 and 58 connect the region ends 44 and 48 respectively to the pin boss 28.

In accordance with the invention, the thrust bearing region 34 is of greater circumferential extent than the non-thrust bearing region 36 and each of the reinforcement ribs 52 and 54 associated with this thrust region has a curvilinear section 62, 64 respectively comprising a substantially smooth transition from the end 42, 44 of the region into an outwardly convex section converging towards the associated boss 26, 28 and merging therewith displaced in a direction along the pin axis towards the perimeter with respect to the merging points of corresponding ribs 56, 58 extending from the opposing ends 46, 48 of the non-thrust bearing region. In this embodiment, but not of necessity, each of the reinforcement ribs 56 and 58 also has a curvilinear section 66, 68 respectively comprising a substantially smooth transition from the non-thrust bearing region into an outwardly convex section converging towards the associated boss 26, 36, conveniently to a part 69 between the said end and the assoicated boss. Also conveniently, the ribs 56 and 58 have substantially the same curvature as the ribs 52 and 54 associated with the thrust bearing region.

The convex region of each rib starts and ends at substantially the same distance from the thrust axis, that is, it is disposed outwardly of a notional rib plane extending axially from the support face and parallel to the thrust axis. The convex part of the rib 52 is defined with respect to notional rib plane 72 and the corresponding convex parts of ribs 54, 56 and 58 are defined with respect to notional rib planes 74, 76 and 78. The reinforcement rib 52, from the end 62' of the convex section 62 and insofar as not merged with the boss 26, extends along the rib plane 72 as a termination region 82. Likewise, ribs 54, 56 and 58 have termination regions 84, 86 and 88 respectively.

Insofar as the rib planes 76 and 78 associated with the non-thrust region 36 are closer to the thrust axis than the rib planes associated with the thrust region, and the pin axis is displaced towards the thrust region, the termination regions 86 and 88 may be expected to extend further in the direction of the thrust axis than the regions 82 and 84. Each of the reinforcement ribs 52 and 54 associated with the bearing region 34 is of substantially uniform thickness along its length from the bearing region to the pin boss, but may vary in thickness axially such that at the edge 90 remote from the head support face the thickness that it provides greater stiffness towards the edge of the bearing region, but overall provides a balance of stiffness and resilience that may be optimised to accommodate variation in thrust loading due to thermal expansion and variation in combustion pressure acting on the reciprocating piston. The reinforcement ribs 56 and 58 associated with bearing region 36 may be similarly formed, but insofar as the non-thrust region is subjected to less lateral force from thermal effects and significantly less force from combustion, the reinforcement ribs are somewhat thinner to avoid excessive stiffness and contribute towards a reduction in metal content, and weight, of the piston.

Where the termination region 82 . . . 88 of the respective reinforcement ribs merges with a boss, the rib edge 90 overlies at least a part of the boss extending in its notional rib plane in said thrust axis direction and spaced from the corresponding ribs of the other bearing regions along the pin axis. Furthermore, the reinforcement ribs associated with each boss extend across the boss in said thrust axis direction with their termination regions in overlapping, side-by-side relationship with each other relative to the pin axis. The overlapping reinforcement ribs may conveniently have their termination regions connected to each other by a bridge 92, 93 overlying, and integral with, the boss.

Thus, in addition to the use of discrete skirt bearing regions of different circumferential extent and not directly coupled by a continuous reinforcement band, the configuration differs from known arrangements in that the reinforcement ribs merge with each boss out of alignment with each other in respect of transmitting thrust forces directly between them and the thrust forces are transmitted into, and primarily resisted by, the bosses rather than the opposite skirt region.

At least one, and preferably each, of the thrust and non-thrust bearing regions 34 and 36 has an axially extending tongue part circumferentially smaller than the region and extending axially beyond the axial edges of the reinforcement ribs associated with the region at said ends. Tongue 94 of thrust region 34 extends circumferentially so that it is contained between the notional rib planes 72 and 74 and likewise the tongue 96 of the non-thrust region 36 is circumferentially contained between the notional rib planes 76 and 78.

The edge 90 of ach reinforcement rib is at such an axial distance from the head support face that the rib edges lie in a plane extending substantially parallel to that of the head support face and the unskirted perimeter sections 37 and 38. Although the axial depth of each rib may vary as a function of distance from the thrust or non-thrust regions. In particular, adjacent the end of each said region it may curve also in an axial direction away from the crown support face to merge with the end of the tongue part both circumferentially and axially.

The piston also includes, formed within the head support face 18, a pair or mass reduction recesses 106 and 108 associated one with each pin boss. The recesses are mirror symmetrical about the thrust axis 40 but each recess is asymmetrical about the pin axis 30 or diameter 31.

The recess 106 is, to one (thrust) side of the pin axis 30, defined by the unskirted perimeter 37 (but spaced therefrom by at least the depth of ring grooves 24), by the boss 26 and by the reinforcement rib 54 connecting the thrust region 34 to the boss. To the other (non-thrust) side of the pin axis the recess is defined by the unsorted perimeter 37, boss 26 and the reinforcement rib 56 connecting the non-thrust region 36 to the boss.

It will be appreciated that insofar as the non-thrust region and its reinforcement ribs are required to transmit significantly smaller thrust forces from contact with the cylinder bore than the thrust region, by defining the non-thrust region 36 of shorter circumferential extent than thrust region 34 there is not only an immediate reduction in contact area with the cylinder bore but also a reduction in mass from the metal eliminated from the region in comparison with the thrust bearing region.

In conjunction with the effective displacement of the reinforcement rib 56 along the pin axis away from the unskirted perimeter 37 the mass reduction recess 106 to the non-thrust side of the pin axis extends further around the side of the boss and the perimeter, as indicated at 110, and increases the volume from which metal can be eliminated in comparison with traditional symmetrical designs.

Thus it will be seen that a reduced mass results not only from a circumferentially shorter non-thrust region but also from displacing the reinforcement ribs associated therewith towards the thrust axis and extending the recesses into the support surface vacated thereby.

Also, the peripheral wall optionally includes a plurality of drain passages 112 extending through the wall from ring groove 24 into one or each recess. As a consequence of extending the recess, it is possible to increase the number of passages, in terms of the circumferential extent of drainage, having a greater number of drain passages on the non-thrust side of the pin axis than on the thrust side.

If desired, and as shown by broken line 120, the recesses 106 and 108 may have bracing webs extending thereacross to inhibit any tendency for the unskirted perimeter 37 to fold inwards under external loading.

It will be appreciated that such reduced mass comes from reducing the amount of metal to the non-thrust side of the diameter 31 and thus displaces the centre of mass towards the thrust bearing region. Insofar as the gudgeon pin axis is displaced from the geometric, longitudinal axis 14, along which combustion pressure effectively acts, the reduction in metal to the non-thrust side of the diameter 31 not only provides an overall reduction in the total mass of the piston but also makes it possible to define the mass asymmetry such that the centre of mass is even further offset towards the thrust bearing region, and possibly even to act through the pin axis 30, and thereby mitigate the effect of turning movement attributable to the centre of mass relative to the gudgeon pin axis.

It will be appreciated that it is not essential that the gudgeon pin axis be displaced from the geometric axis but in such event the centre of mass of such asymmetric piston will produce a turning movement about the pin axis.

What is claimed is:

1. An engine piston comprising a unitary metal body comprising:

head of substantially circular cross-section centered on a longitudinal piston axis defined by an upper crown face, a lower support face and, extending between the faces, a perimeter wall of the head defining a belt of ring grooves;

a pair of gudgeon pin bosses, extending axially form the support face, spaced from the perimeter of the head and from each other along a pin axis;

a circumferentaily incomplete, axially extending bearing skirt portion defining at the perimeter a thrust bearing region and a non-thrust bearing region spaced apart at opposite sides of the pin axis, each said bearing region extending circumferentially between region ends and being centered on a thrust axis perpendicular to the pin axis, the thrust bearing region being of greater circumferential extent than that of the non-thrust bearing region;

bearing skirt reinforcement ribs associated individually with said ends of the thrust and non-thust beaing regions, each said reinforcement ribs extending axially from the head and connecting its associated region end to a said gudgeon pin boss, the reinforcement ribs associated with the ends of the thrust bearing region each having a curvilinear section comprising a substantially smooth transition from the end of the associated region into an outwardly convex section converging toward the associated gudgeon pin boss and merging therewith displaced in a direction along the pin axis toward the perimeter with respect to the reinforcement ribs extending from the ends of the non-thrust bearing region, and in the support face a pair of recesses associated one with each gudgeon pin boss, each said recess being disposed between the pin boss and the perimeter wall and asymmetrical about the pin axis, the recess to one side of the pin axis being defined by the unskirted perimeter, the boss and the reinforcement rib connecting the thrust bearing region and the boss, and to the other side of the pin axis being defined by the unskirted perimeter, the boss and the reinforcement rib connecting the no-thrust region to the boss, and wherein the center of mass and gudgeon pin axis are displaced from the longitudinal axis in the same direction by substantially the same distance.

2. A piston as claimed in claim 1 including a plurality of drain passages extending through the perimeter wall from a ring groove into at least one recess, the number of drain passages on the non-thrust side of the pin axis being greater than the number of passages on the thrust side.

3. A piston as claimed in claim 1 in which each reinforcement rib associated with an end of a non-thrust bearing region has a curvilinear section comprising a substantially smooth transition from the end of the region into an outwardly convex section converging toward a point between said end and the associated boss.

4. A piston as claimed in claim 3 in which the outwardly convex sections of the reinforcement ribs associated with the thrust and non-thrust regions have substantially the same curvature.

5. A piston as claimed in claim 4 in which the spaced ends of each convex section lie in a rib plane extending substantially parallel to the thrust axis.

6. A piston as claimed in claim 5 in which each reinforcement rib between the end of the convex section and the associated piston boss extends as a termination region substantially in the rib plane.

7. A piston as claimed in claim 5 in which at least one of the thrust and non-thrust bearing regions has an axially extending tongue termination spaced form the ends of said bearing regions and extending axially beyond the axial edges of the reinforcement ribs that extend from said ends of said bearing regions; and for each said thrust and non-thrust bearing region, the circumferential extent of the tongue is such that it is contained totally between the rib planes of the associated reinforcement ribs.

8. A piston as claimed in claim 1 in which at least one of the thrust and non-thrust bearing regions has an axially extending tongue, terminating spaced from the ends thereof, extending axially beyond the axial edges of the reinforcement ribs extending from said ends of the region.

9. A piston as claimed in claim 1 in which the axial edge of the termination region of the rib overlies at least part of the boss in spaced relationship therewith.

10. A piston as claimed in claim 9 in which the termination regions of the reinforcement ribs of the thrust and non-thrust regions associated with each boss extend across the boss in overlapping relationship with each other.

11. A piston as claimed in claim 10 in which said overlapping termination regions are connected to each other by a bridge overlying and integral with the boss.

* * * * *

UNITED STATES PATENT AND TRADEMARK OFFICE
CERTIFICATE OF CORRECTION

PATENT NO. : 6,860,190 B2
DATED : March 1, 2005
INVENTOR(S) : Oversby et al.

It is certified that error appears in the above-identified patent and that said Letters Patent is hereby corrected as shown below:

Column 6,
Line 34, after "axially" delete "form" and insert therein -- from --.
Line 47, after "thrust and" delete "non-thust beaing" and insert therein -- non-thrust bearing --.

Column 7,
Line 1, after "connecting the" delete "no-thrust" and insert therein -- non-thrust --.

Signed and Sealed this

Twelfth Day of July, 2005

JON W. DUDAS
*Director of the United States Patent and Trademark Office*